E. SANDERSON.
Wind-Wheels.
No. 145,970.            Patented Dec. 30, 1873.
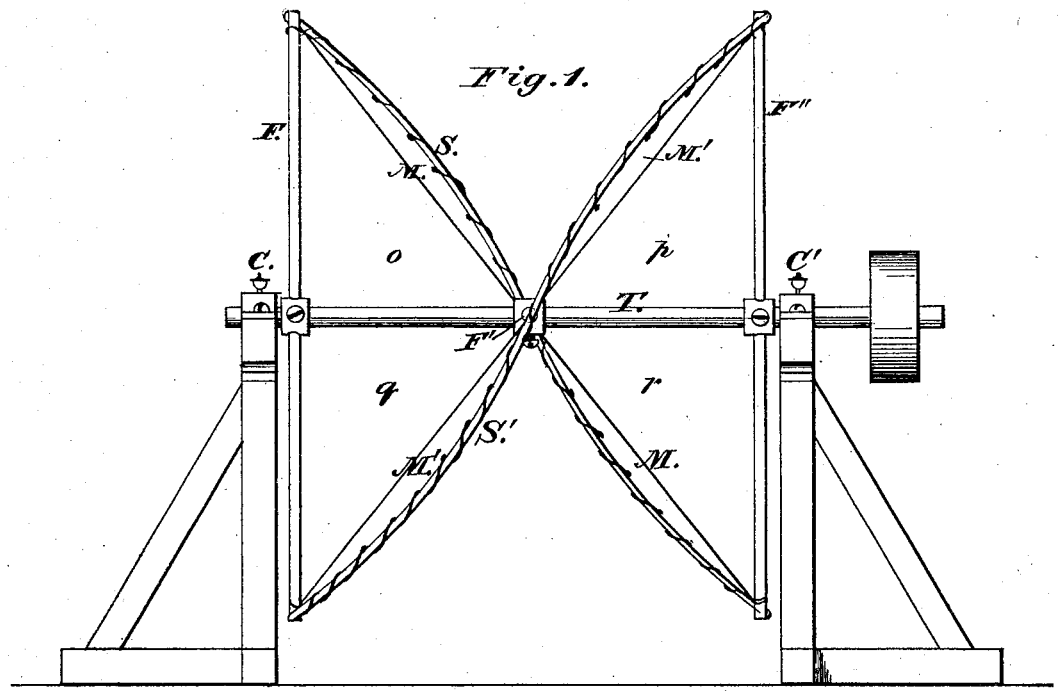
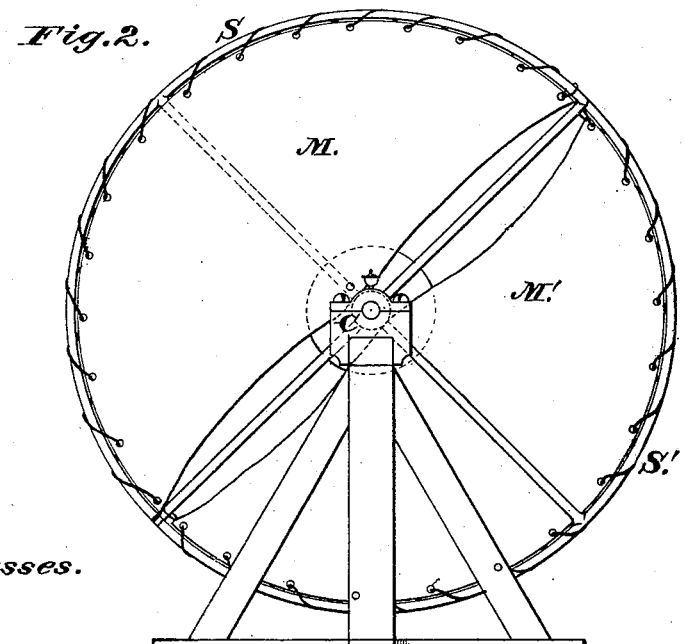

UNITED STATES PATENT OFFICE.

EMILIUS SANDERSON, OF PARIS, FRANCE.

IMPROVEMENT IN WINDMILLS.

Specification forming part of Letters Patent No. 145,970, dated December 30, 1873; application filed March 29, 1873.

*To all whom it may concern:*

Be it known that I, EMILIUS SANDERSON, of Paris, France, have invented certain Improvements in Windmills, of which the following is a specification, reference being had to the accompanying drawings:

Figure I is a side view of the machine embodying my invention. Fig. II is an end view of the same.

My invention consists in or relates to windmills; the object being to construct a mill so that it may work without either being set to the wind, or having its surfaces reduced as the power of the wind increases. In other words, the said apparatus will work under any wind, whatever may be its power or direction, (except at right angles with the shaft.)

The following is the construction of the windmill: S S' represent two iron half-circles, starting from the opposite ends of a T-iron yard, F, which is at right angles with an iron shaft, T, and extending in two opposite directions, each iron half-circle being fastened, half-way, to one of the extremities of a second yard, F', that is at right angles with the first yard, F, as far as the ends of a third yard, F'', parallel with the first yard, F, in order to make two flat semicircular surfaces, M M', by stretching canvas from the iron half-circles to the shaft, to which they are fastened by the middle of their chords, yet without allowing the spaces $o\ p\ q\ r$ to be filled.

The apparatus being thus constructed, and allowed to revolve on two chairs, C C', will turn from whatever quarter the wind may blow, except when striking the shaft mathematically at right angles.

When the surfaces of the apparatus are constructed so as to form an angle of forty-five degrees with the shaft—a given wind of a certain power being supposed to blow in a parallel direction with the shaft, and to continue blowing round the above apparatus until it comes back to the quarter from which it started—the apparatus will move as follows: When the wind is parallel with the shaft, the effect on the apparatus is about the same as when it strikes an ordinary mill of the same diameter. Then, when the supposed wind blows gradually round, the speed remains about the same until it forms an angle of forty-five degrees with the shaft, in which case the machine acquires its maximum of speed. From forty-five degrees to ninety degrees, the same supposed wind continuing to blow successively at different angles, the speed will decrease until it reaches ninety degrees, when the wings move to and fro without producing any effective work; but as soon as the wind blows again at the slightest angle beyond ninety degrees, the apparatus will start again, (the rotation being reversed,) the speed increasing again until the wind forms an angle of one hundred and thirty-five degrees, the speed being then exactly the same as it was at forty-five degrees, and so on. Hence, if the apparatus be fixed so as to direct the horizontal shaft due north and south, the motion will be most rapid when the wind blows either north, south, northeast, northwest, southeast, or southwest, and less rapid between the four last-mentioned points, so that no available force of that agent will be lost, except when blowing either from the east or from the west.

Should even the trifling loss of power when the wind blows at right angles with the shaft be taken into consideration, the fact that the apparatus will work whatever be the power of the wind, except in hurricanes, when the mill must be allowed to turn loose, (the brake must never be used to stop the mill—the apparatus can be made of much stronger materials than canvas,) without having its surfaces reduced, will give an idea of the immense advantages that may be derived from a machine the surfaces of which are sucessively multiplied by pressures expressed by twenty-seven, sixty, one hundred, and two hundred and fifty pounds on every yard square of its wings.

Other advantages of this invention are, that it is simple in construction, composed of few parts, more durable, less likely to get out of repair, and more easily managed than any other apparatus of the kind in use.

What I claim as my invention, and desire to secure by Letters Patent of the United States of America, is—

The peculiar construction of the said appaparatus, as and for the purposes hereinbefore described, it being a windmill, consisting of two semicircular (or semi-oval) flat surfaces, fastened on a horizontal shaft so as to be about at right angles between themselves, being fastened to said shaft by the middle of the lines that are to be considered as the chords of the arcs of the semicircles, said surfaces forming angles of about forty-five degrees with said shaft, that revolves in two chairs.

E. SANDERSON.

Witnesses:
   F. OLCOTT,
   DAVID T. S. FULLER.